(12) United States Patent
Katzer

(10) Patent No.: US 7,716,631 B1
(45) Date of Patent: May 11, 2010

(54) ARCHITECTURE BLUEPRINT TOOL AND METHOD

(75) Inventor: Robin Dale Katzer, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 775 days.

(21) Appl. No.: 11/039,160

(22) Filed: Jan. 20, 2005

(51) Int. Cl.
*G06F 9/44* (2006.01)

(52) U.S. Cl. .................. 717/102; 717/105; 717/107

(58) Field of Classification Search .......... None
See application file for complete search history.

(56) References Cited

U.S. PATENT DOCUMENTS

| | | | | |
|---|---|---|---|---|
| 6,059,842 | A * | 5/2000 | Dumarot et al. ............. | 717/153 |
| 6,968,535 | B2 * | 11/2005 | Stelting et al. .............. | 717/104 |
| 7,047,518 | B2 * | 5/2006 | Little et al. .................. | 717/108 |
| 2002/0066074 | A1 * | 5/2002 | Jabri .......................... | 717/105 |
| 2004/0177335 | A1 * | 9/2004 | Beisiegel et al. ............ | 717/102 |
| 2005/0223363 | A1 * | 10/2005 | Black-Ziegelbein et al. . | 717/127 |
| 2006/0041440 | A1 * | 2/2006 | Cheng et al. ................ | 705/1 |

OTHER PUBLICATIONS

Cheng et al. Building Collaboration into IDEs. Queue, vol. 1 Issue 9, Dec./Jan. 2003-2004, pp. 40-50. Retrieved on [Dec. 17, 2009] Retrieved from the Internet: URL<http://delivery.acm.org/10.1145/970000/966803/cheng.pdf?key1=966803&key2=1018801621&coll=GUIDE&dl=GUIDE&C FID=68742942 &CFTOKEN=85585750.*
Eichberg et al. XIRC a Kernel for Cross-Artifact Information Engineering in Software Development Environments, Nov. 2004, pp. 182-191, Retrieved on [Dec. 16, 2009] Retrieved from the Internet: URL<http://ieeexplore.ieee.org/stamp/stamp.jsp?arnumber=01374318.*

* cited by examiner

*Primary Examiner*—Tuan Q Dam
*Assistant Examiner*—Cheneca P Smith

(57) ABSTRACT

A development system for developing enterprise software. The system consists of a data store maintaining information related to enterprise hardware components, including information on servers and applications operating on the servers. The system also includes an architectural component including a display operable for architecture of the enterprise software by selection via the display of one or more of the servers and applications operating on the servers. Also included in the development system is a development engine that can deploy a first integrated development environment for development of a first software component, and deploy a second integrated development environment for development of a second software component. The system also includes an interface component that allows information stored in a data store by the first integrated development environment to be accessible by the second integrated development environment.

19 Claims, 5 Drawing Sheets

US 7,716,631 B1

ARCHITECTURE BLUEPRINT TOOL AND METHOD

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to computer system architecture blueprints. More particularly, embodiments of the present invention provide a tool and method for creating and using such blueprints.

BACKGROUND OF THE INVENTION

Computer system architects typically create high-level designs for the configuration of and information flows among hardware and software components in computing systems. To produce such designs, the architects typically need to know the properties of the hardware to be used and of the software that will be deployed on that hardware. Software developers also typically need to be aware of the characteristics of the hardware on which their software will eventually be deployed.

SUMMARY OF THE INVENTION

An embodiment of the invention is a development system for developing enterprise software. The development system consists of one or more data stores maintaining information related to enterprise hardware components, including information on servers and applications operating on the servers. The development system also includes an architectural component including a display operable for architecture of the enterprise software by selection via the display of one or more of the servers and applications operating on the servers. Also included in the development system is a development engine that can deploy a first integrated development environment for development of a first software component of the enterprise software, and deploy a second integrated development environment for development of a second software component of the enterprise software. The development system also includes an interface component that allows information stored in a data store by the first integrated development environment to be accessible by the second integrated development environment.

An alternative embodiment is a method for development of an architectural blueprint for development of enterprise software applications. The method consists of providing a data store that can maintain information related to enterprise hardware and software components including server information and information related to the applications operating on the servers. Also in the method, enterprise software applications are architected by arrangement, via a display of a software tool, of the enterprise hardware and software components to support the enterprise software application to be developed. The method also consists of launching, via a development engine, a first integrated development environment for development of a first software component of the enterprise software application to be developed. Information related to the enterprise software application to be developed is stored in the data store. A second integrated development environment for development of a second software component of the enterprise software application to be developed is launched via the development engine. The method also consists of accessing the information stored in the data store related to the enterprise software application to be developed by the first or second integrated development environment to promote development of the first or second software components of the enterprise software application to be developed, and further accessing the information stored in the data store related to enterprise hardware and software components to promote development of the first or second software components of the enterprise software application to be developed.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

In an embodiment, a blueprint of a computer system design is created on a graphical user interface (GUI). When an element in the blueprint is selected in the GUI, a prompt is displayed that allows a user to specify desired properties for the selected element. After the properties have been specified, an element can be selected in the GUI and its properties will be displayed.

Multiple hierarchical blueprints can be created and tied to each other. This can allow easy navigation among a top level view of the overall architecture of a computer system, various hardware level views of the system, and various software level views. Properties of the elements in the blueprints can be specified and viewed at each level. This eliminates the need to log in to multiple machines individually to determine their configurations.

In addition, properties of a commercially available development engine are leveraged to allow multiple integrated development environments (IDE's) to share data. That is, data stored by one IDE is accessible to other IDE's. The data might include programming code, properties or settings for a machine on which the code will be deployed, or other information. Unmodified commercially available development engines are not known to allow such data sharing among multiple IDE's.

Figure 1:
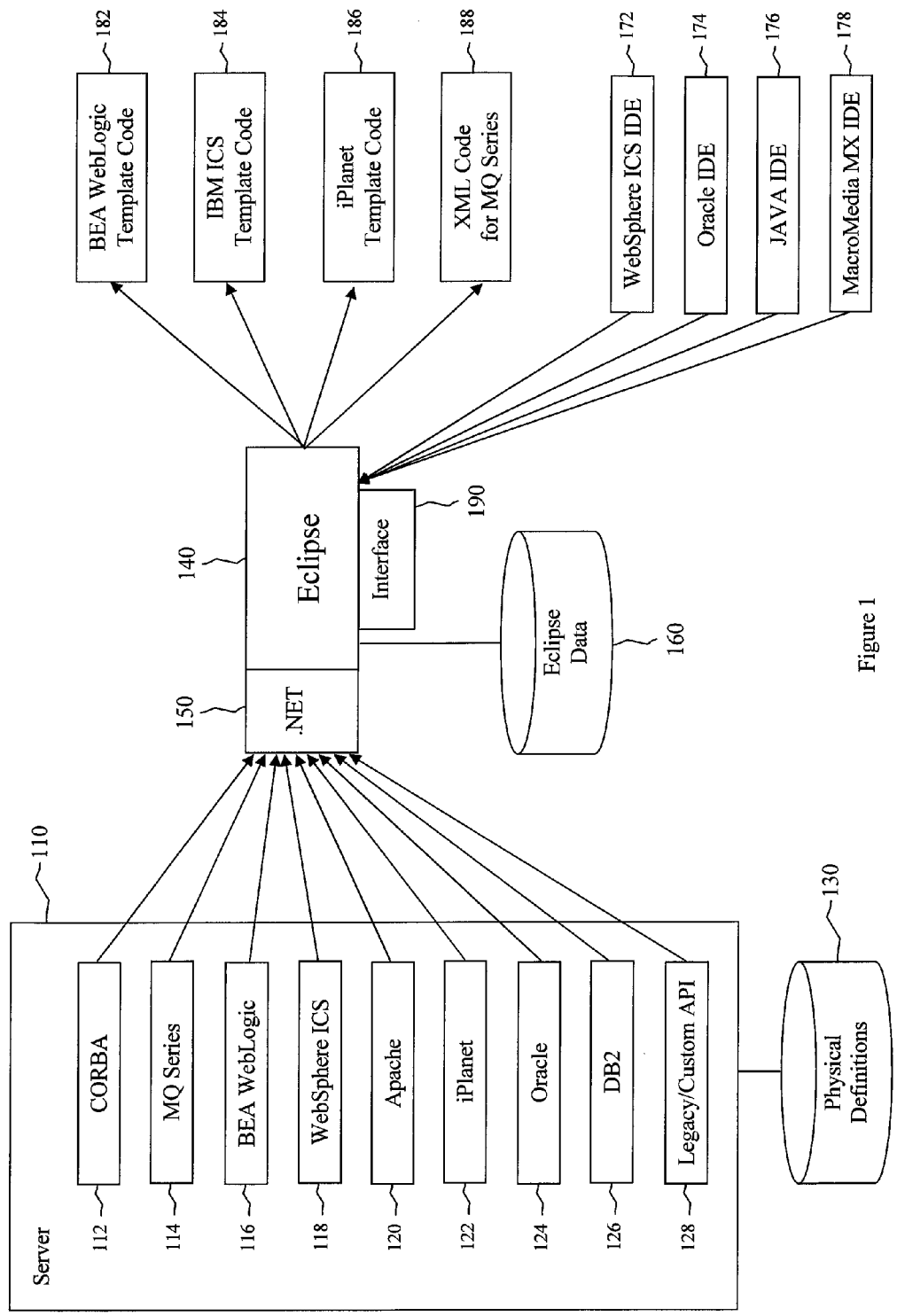
FIG. 1 is a block diagram of an architecture blueprint tool according to one embodiment of the present disclosure.

FIG. 1 illustrates components that might be involved in the creation of a blueprint. A server 110 holds the properties of various products following various protocols such as CORBA 112, MQ Series 114, BEA WebLogic 116, WebSphere ICS 118, Apache 120, iPlanet 122, Oracle 124, DB2 126, and legacy or custom API's 128. One of skill in the art will recognize that other products following other protocols might also be present.

Definitions of the physical properties of these products can be stored in a data store 130. These properties can be sent to a development engine such as Eclipse 140. Eclipse 140 is a commercially available integrated development tool in which the IDE's for multiple application development platforms can be combined into a single interface. Eclipse 140 consists of a small kernel to which multiple modules known as plug-ins can be attached. Each plug-in allows the manipulation of a different type of content, such as Java, C/C++, HTML, XML, JSP, or EJB. A developer can create a customized version of Eclipse 140 by attaching a selected set of plug-ins. Eclipse 140 can then provide the developer with a set of seamlessly integrated development tools that use well-defined interfaces, classes, and methods. In other embodiments, other development engines similar to Eclipse 140 could be used.

In the embodiment of FIG. 1, the properties of the products are transmitted via .NET 150 but in other embodiments other communication protocols could be used. Eclipse 140 can store the properties in a data store 160.

The embodiment of FIG. 1, the commercial, off-the-shelf IDE's include a WebSphere ICS IDE 172, an Oracle IDE 174, a JAVA IDE 176, and a MacroMedia MX IDE 178, but in other embodiments other IDE's could be present. Eclipse 140 can then be used to create templates for programming code in various protocols. In the embodiment of FIG. 1, the protocols include BEA WebLogic 182, IBM ICS 184, iPlanet 186, and XML 188, but in other embodiments other protocols could be used.

Figure 2:
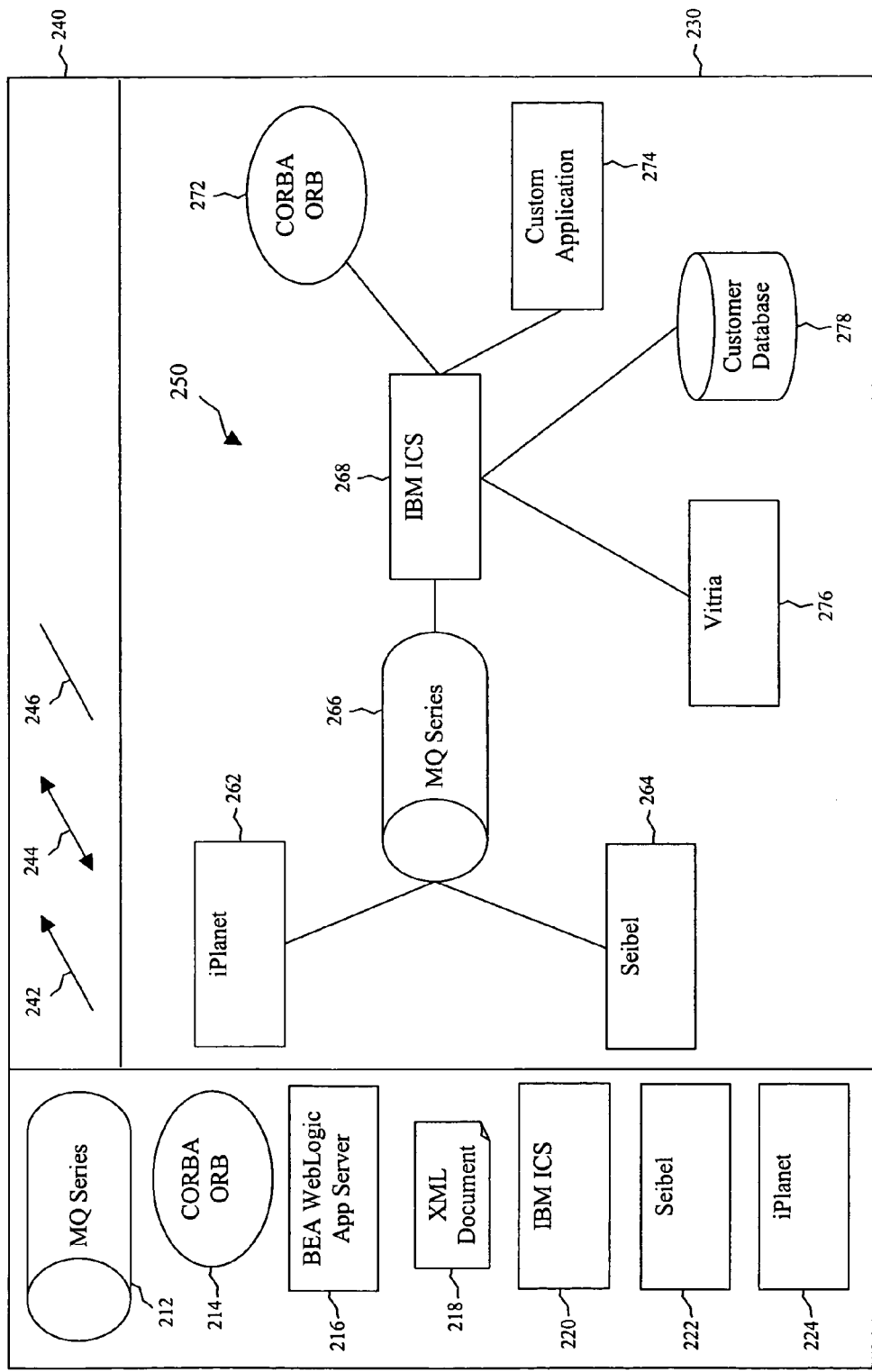
FIG. 2 is a block diagram of a graphical user interface that might be displayed in one embodiment of the present disclosure.

FIG. 2 illustrates an architectural component including a display or GUI 200 that an architect might use to create blueprints. Symbols of various blueprint elements are shown in one section 210 of the GUI 200. In the embodiment of FIG. 2, the elements include an MQ Series queue 212, a CORBA ORB 214, a BEA WebLogic app server 216, an XML document 218, IBM ICS 220, Seibel 222, and iPlanet 224, but in other embodiments other elements could be present. Another section 230 is a drawing area into which the symbols can be dragged. Another section 240 contains arrows 242 and 244 and connecting lines 246 that can be dragged into the drawing area 230 to show the connections among the elements.

An architect can drag items from the element section 210 and the connector section 240 into the drawing area 230 to create a blueprint. In the embodiment of FIG. 2, a blueprint 250 has been created that includes iPlanet 262 and a Seibel integrated desktop 264, both of which are connected to an MQ Series order queue 266. The MQ Series order queue 266 is connected to an IBM ICS service broker 268. Connected to the IBM ICS service broker 268 are a CORBA ORB 272, a custom application 274, a Vitria order manager 276, and a customer database 278.

After a blueprint has been created in the drawing area 230, selection of an item in the blueprint, via a mouse click for example, will cause a prompt to be displayed. The prompt will assist the architect in specifying the properties needed by the selected item. As an example, if the architect selects the customer database 278, a prompt might appear that allows the architect to specify the type of database to be used, the machine on which the database will reside, the storage capacity needed, the length of the records to be stored, and other parameters. The specified properties can be stored in the Eclipse data store 160.

After the properties of an item in a blueprint have been specified and stored, selection of that item, via a mouse click for example, will cause its properties to be displayed. Details of the configuration of the selected item might also be displayed in the GUI. For example, if the customer database 278 is selected after its properties have been specified, a display or GUI similar to that shown in FIG. 3 might appear. In this GUI 300, a drawing area 310 contains a blueprint 320 that shows configuration details for the customer database 278. In this case, the customer database 278 consists of a single disk 330 to which two machines, machine A 340 and machine B 350, are connected. Machine A 340 and machine B 350 are connected to each other by connection 360.

The properties of machine A 340 and machine B 350 can be listed in a properties section 370 of the GUI 300. For example, the properties might include the manufacturer, model number, processor speed, and RAM capacity of a machine. The hard drive capacity and file system for a machine might also be listed. Also, the operating system the machine uses, the settings for the operating system, and the software installed on the machine might be shown. For a database, the overall capacity of the database, the cache size, and the record length might be listed.

Figure 3:
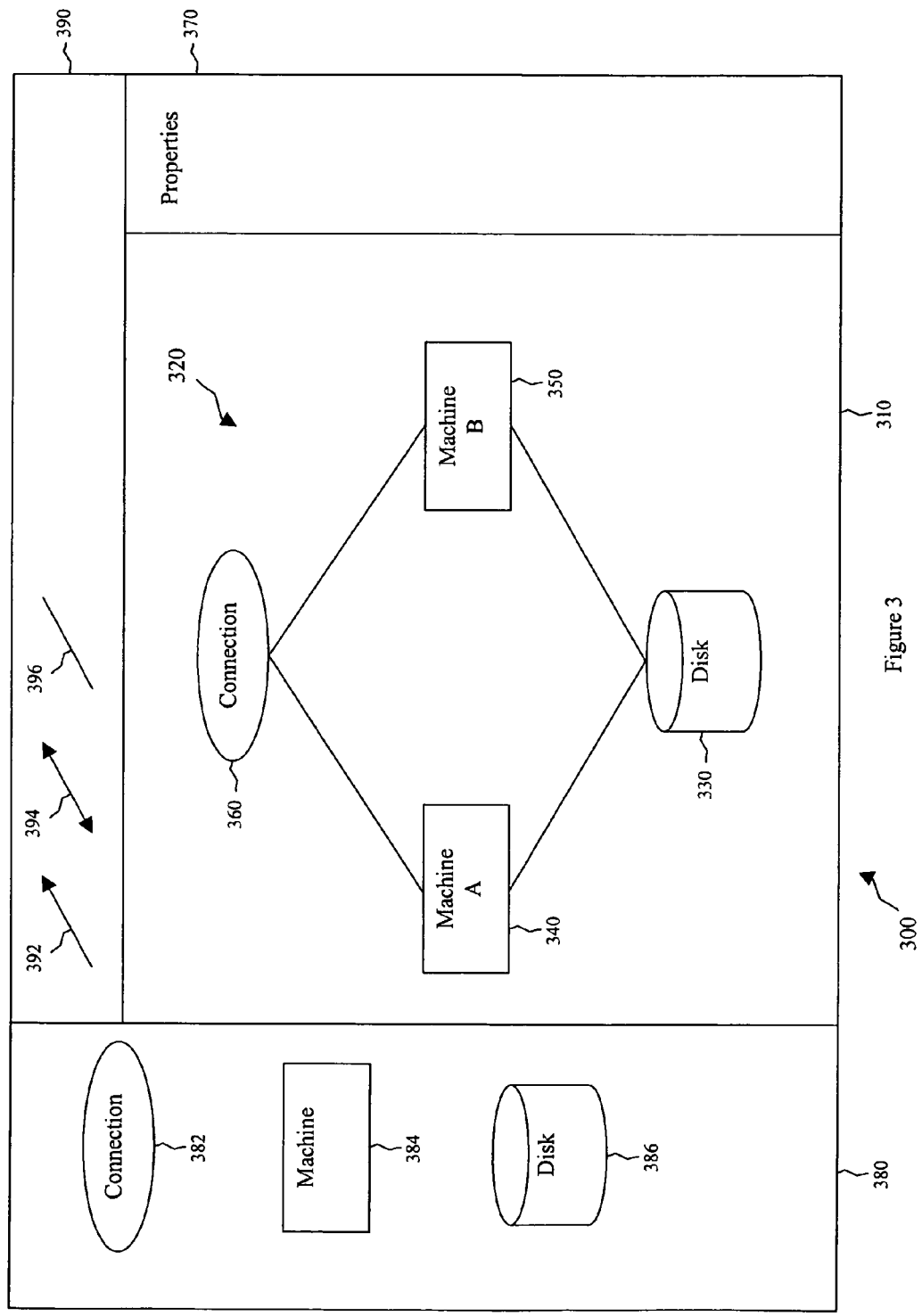
FIG. 3 is a block diagram of another graphical user interface that might be displayed in an embodiment of the present disclosure.

If the blueprint 320 of the configuration details for the customer database 278 has not yet been created, an architect could create a blueprint in the drawing area 310. Similar to the element area 210 of FIG. 2, an element area 380 contains symbols of elements that might be used in a blueprint of configuration details. The symbols can be dragged into the drawing area 310 to create a blueprint. In the embodiment of FIG. 3, the symbols include a connection 382, a machine 384, and a disk 386, but in other embodiments other symbols might be present. A section 390 of the GUI 310 contains arrows 392 and 394 and connecting lines 396 that can be dragged into the drawing area 310 to show the connections and data flow directions among the elements.

If an item other than the customer database 278 had been selected in the drawing area 230 of FIG. 2, the GUI that appeared would have an element area that contained elements pertinent to the selected item. For example if iPlanet 262 had been selected, the drawing area of the GUI that appeared might contain jsp's, servlets, html pages, and other items that pertain to iPlanet 262.

Similar procedures can be followed for the items in the blueprint 320 in FIG. 3. That is, if an item in the blueprint 320 is selected, a prompt might appear to assist an architect in specifying the properties of the selected item. If the properties have already been specified, a GUI might appear showing the properties of the item and details of the configuration of the item. For example, if machine A 340 is selected and the properties of machine A 340 have already been specified, a display or GUI similar to that in FIG. 4 might appear.

In this GUI 400, a drawing area 410 contains a blueprint 420 that shows configuration details for machine A 340. In this case, machine A 340 contains records that specify a customer 432, an address 434, a contact 436, and a phone number 438. In other embodiments other data could be present. The properties of machine A 340 can be listed in a properties section 440 of the GUI 400. The properties might be similar to those listed above in the discussion of the properties section 370 of the GUI 300 in FIG. 3.

Figure 4:
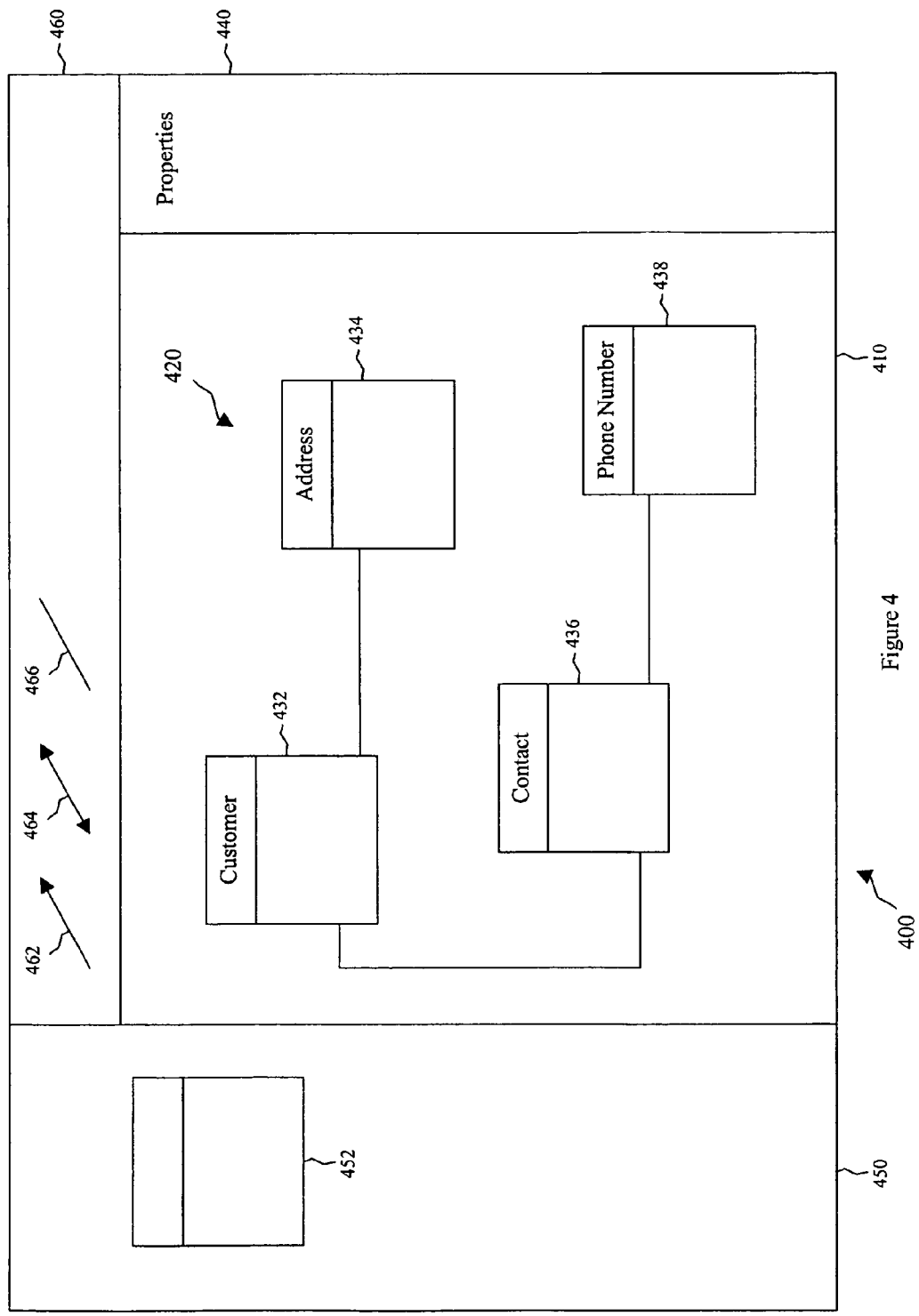
FIG. 4 is a block diagram of another graphical user interface that might be displayed in an embodiment of the present disclosure.

If the blueprint 420 of the configuration details for machine A 340 has not yet been created, an architect could create a blueprint in the drawing area 410. As in FIGS. 2 and 3, an element area 450 contains symbols of elements that might be used in a blueprint of configuration details. The symbols can be dragged into the drawing area 410 to create a blueprint. In the embodiment of FIG. 4, the symbols include a data record 452, but in other embodiments other symbols might be present. If an item other than machine A 340 had been selected in the drawing area 310 of FIG. 3, the GUI that appeared would have an element area that contained elements pertinent to the selected item. A section 460 of the GUI 410 contains arrows 462 and 464 and connecting lines 466 that can be dragged into the drawing area 410 to show the connections and data flow directions among the elements.

While the above discussion has focused on items such as databases and physical machines, similar concepts could apply to the connections among such items. For example, in FIG. 2, iPlanet 262 communicates through MQ Series 266 to IBM ICS 268. If a connecting line between iPlanet 262 and IBM ICS 268 is selected, by a mouse click for example, an XML document that is being transmitted between iPlanet 262 and IBM ICS 268 might be displayed. The properties of the connection between the two elements might also be shown. If the properties of the connection or of the data that is being sent over the connection have not yet been specified, a prompt to enter such data can appear when the connecting line is selected.

Returning to FIG. 1, a developer can create a piece of code in Eclipse 140 and specify the properties of the machine on which the code will be deployed. The code and the machine properties can then be stored in the Eclipse data store 160. When other developers subsequently use that code, the properties of the machine on which the code will run will already be specified. Alternatively, if a developer specifies the settings for a machine or an operating system, those settings will persist when another developer accesses that machine or that operating system. In this way, work done in or data stored by a first IDE accessible through Eclipse 140 is available to a second IDE accessible through Eclipse 140.

As an example, a developer creating JAVA code in the JAVA IDE 176 through Eclipse 140 might point the IDE 176 to a particular machine where the code will be deployed. The properties of the machine that the IDE 176 is pointed to can be stored in the Eclipse data store 160 along with a blueprint that depicts that machine. Alternatively, the code and the blueprint could be stored in different places but tied together in the Eclipse data store 160.

In another example, if a developer builds a framework in the WebSphere ICS IDE 172, the developer can state in the Eclipse data store 160 that the framework is available. Other developers would then be able to use that framework.

An interface 190 might be present to allow communication among different IDE's and to allow data to be stored in a location and a format that is accessible by different IDE's. The interface 190 might be integrated with Eclipse 140, as shown in FIG. 1, or might be a separate component through which communications among the IDE's, Eclipse 140, and various data stores can pass. In either case, the interface 190 facilitates the sharing of data among the IDE's, Eclipse 140, and the data stores.

Once a blueprint is complete and the properties of the elements in the blueprint have been defined, the properties are typically manually exported into a real system. This might be done in a simple text document that describes the parameters to be assigned to the components shown in the blueprint. A system administrator might use the document to apply operating system settings to a particular machine. A developer might use the document to apply tuning settings to a JAVA virtual machine, for example. Those settings can be manually stored in the Eclipse data store 160 and can then be used as a template for other machines. Existing templates can be imported into an IDE 172, 174, 176, or 178 to assist in creating code.

Figure 5:
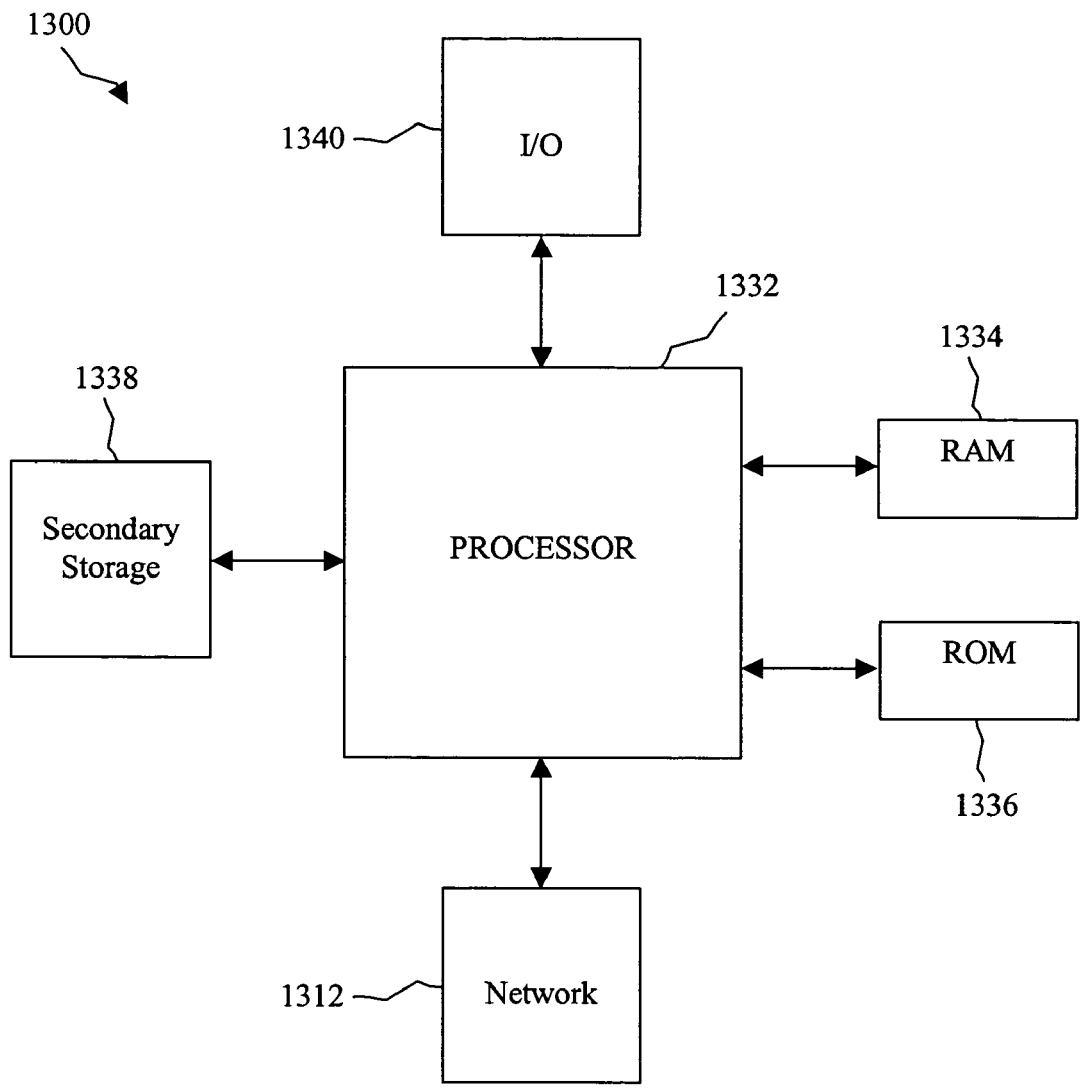
FIG. 5 is a block diagram of a computer system operable for some of the various embodiments of the present disclosure.

An architecture blueprint tool and method as described above may generally be implemented on a variety of different computer systems. FIG. 5 illustrates a typical, general-purpose computer system suitable for implementing the present invention. The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that the Architecture Blueprint Tool and Method may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

What is claimed is:

1. A development system for developing enterprise software, the development system comprising:
    a one or more data stores maintaining at least one of the group consisting of: information and programming code related to enterprise hardware components including information on at least some servers and applications operating on these servers; information and programming code related to operating system settings; and information and programming code related to enterprise hardware components and operating system settings;
    an architectural component including a display operable for architecture of the enterprise software by selection via the display of one or more of the servers and applications operating on the servers;
    a development engine operable for deployment of at least a first commercial-off-the-shelf integrated development environment for development of a first software component of the enterprise software, the development engine further operable for deployment of at least a second commercial-off-the-shelf integrated development environment for development of a second software component of the enterprise software, wherein the second commercial-off-the-shelf integrated development environment is a different type of integrated development environment than the first commercial-off-the-shelf integrated development environment; and
    an interface component to promote sharing of data between the first commercial-off-the-shelf integrated development environment and the second commercial-off-the-shelf integrated development environment, wherein data developed in the first commercial-off-the-shelf integrated development environment during development of the first software component is stored by the development engine to the one or more data stores under control of the first commercial-off-the-shelf integrated development environment and is accessable by the development engine under control of the second commercial-off-the-shelf integrated development environment for use in development of the second software component by the second commercial-off-the-shelf integrated development environment.

2. The development system of claim 1 wherein the operating system settings and the hardware information are maintained to promote development and compatibility of developed software.

3. The development system of claim 2 wherein related operating system settings and related hardware information are stored and implemented in a single location.

4. The development system of claim 1 further comprising templates selectable by the developers for the applications operating on the enterprise hardware, the templates compatible with the respective server application and enterprise hardware component.

5. The development system of claim 1 wherein the information maintained by the one or more data stores related to the enterprise hardware includes at least one of a manufacturer, a model number, a processor speed, a RAM capacity, and a hard drive capacity.

6. The development system of claim 1 wherein the information maintained by the one or more data stores related to the applications operating on the enterprise hardware includes at least one of a file system, an operating system, a database capacity, a database cache size, and a database record length.

7. The development system of claim 1 wherein the development engine is further defined as Eclipse.

8. The development system of claim 1 wherein the enterprise hardware components are network servers.

9. The development system of claim 1 wherein the applications operating on the enterprise hardware components may include server applications to support at least one of CORBA, MQ Series, BEA Web Logic, WebSphere ICS, Apache, iPlanet, Oracle, and DB2 applications.

10. The development system of claim 1, wherein the first integrated development environment and the second integrated development environment are selected from the group consisting of a WebSphere ICS integrated development environment, an Oracle integrated development environment, a Java integrated development environment, and a MacroMedia MX integrated development environment.

11. A method for development of an architectural blueprint for development of enterprise software applications, the method comprising:
    providing one or more data stores maintaining at least one of the group consisting of: information and programming code related to enterprise hardware and software components including server information and information related to the applications operating on the servers; information and programming code relating to operating system settings; and information and programming code related to enterprise hardware and software components and operating system settings;
    architecting enterprise software applications by arrangement, via a display of a software tool, of the enterprise hardware and software components to support the enterprise software application to be developed;

launching, via a development engine, a first commercial-off-the-shelf integrated development environment for development of a first software component of the enterprise software application to be developed;

storing, via the development engine to the one or more data stores in a location and a format that is accessible by other commercial-off-the-shelf integrated development engines, information that is developed in the first integrated development environment in the development of the first software component of the enterprise software application to be developed;

launching, via the development engine, a second commercial-off-the-shelf integrated development environment for development of a second software component of the enterprise software application to be developed, wherein the second commercial-off-the-shelf integrated development environment is different than the first commercial-off-the-shelf integrated development environment; and accessing, via the development engine, the information stored in the one or more data stores related to the enterprise software application to be developed by the second integrated development environment to promote development of the second software component of the enterprise software application to be developed, and further accessing, via the development engine, the information stored in the one or more data stores related enterprise hardware and software components to promote development of the second software component of the enterprise software application to be developed.

12. The method of claim 11 further comprising storing and implementing related operating system settings and related hardware information in a single location.

13. The method of claim 11 further comprising templates selectable by the developers for the applications operating on the enterprise hardware, the templates compatible with the respective server application and enterprise hardware component.

14. The method of claim 11 wherein the information maintained by the one or more data stores related to the enterprise hardware includes at least one of a manufacturer, a model number, a processor speed, a RAM capacity, and a hard drive capacity.

15. The method of claim 11 wherein the information maintained by the one or more data stores related to the applications operating on the enterprise hardware includes at least one of a file system, an operating system, a database capacity, a database cache size, and a database record length.

16. The method of claim 11 wherein the development engine is further defined as Eclipse.

17. The method of claim 11 wherein the enterprise hardware components are network servers.

18. The method of claim 11, further comprising accessing, via the development engine, the information stored in the one or more data stores related to the enterprise software application to be developed by the first integrated development environment to promote development of the first software component of the enterprise software application to be developed, and further accessing, via the development engine, the information stored in the one or more data stores related enterprise hardware and software components to promote development of the first software component of the enterprise software application to be developed.

19. The method of claim 11, wherein one of
the first integrated development environment is a WebSphere ICS integrated development environment and the second integrated development environment is selected from the group consisting of an Oracle integrated development environment, a Java integrated development environment, and a MacroMedia MX integrated development environment;
the first integrated development environment is an Oracle integrated development environment and the second integrated development environment is selected from the group consisting of a WebSphere ICS integrated development environment, a Java integrated development environment, and a MacroMedia MX integrated development environment;
the first integrated development environment is a Java integrated development environment and the second integrated development environment is selected from the group consisting of a WebSphere ICS integrated development environment, an Oracle integrated development environment, and a MacroMedia MX integrated development environment; or
the first integrated development environment is a MacroMedia MX integrated development environment and the second integrated development environment is selected from the group consisting of a WebSphere ICS integrated development environment, an Oracle integrated development environment, and a Java integrated development environment.

* * * * *